(12) United States Patent
Maes (10) Patent No.: US 7,860,490 B2
(45) Date of Patent: Dec. 28, 2010

(54) METHODS AND SYSTEMS FOR EXPOSING ACCESS NETWORK CAPABILITIES USING AN ENABLER PROXY

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1577 days.

(21) Appl. No.: 11/130,636

(22) Filed: May 16, 2005

(65) Prior Publication Data

US 2006/0117109 A1 Jun. 1, 2006

Related U.S. Application Data

(60) Provisional application No. 60/632,698, filed on Dec. 1, 2004.

(51) Int. Cl.
*H04M 3/00* (2006.01)

(52) U.S. Cl. ............... 455/418; 455/412.1; 455/412.2; 455/414.1; 370/310

(58) Field of Classification Search ............ 455/418, 455/412.1, 412.2, 414.1, 566, 456.1, 456.2, 455/456.3; 709/203, 230, 245; 370/310
See application file for complete search history.

(56) References Cited

U.S. PATENT DOCUMENTS

| | | | |
|---|---|---|---|
| 5,850,517 A | 12/1998 | Verkler et al. | |
| 6,157,941 A | 12/2000 | Verkler et al. | |
| 6,230,271 B1 | 5/2001 | Wadlow et al. | |
| 6,336,138 B1 | 1/2002 | Caswell et al. | |
| 6,374,305 B1 | 4/2002 | Gupta et al. | |
| 6,578,159 B1 | 6/2003 | Kitagawa et al. | |
| 6,611,812 B2 | 8/2003 | Hurtado et al. | |
| 6,748,570 B1 | 6/2004 | Bahrs et al. | |
| 6,792,605 B1 | 9/2004 | Roberts et al. | |
| 6,978,348 B2 | 12/2005 | Belknap et al. | |
| 6,985,939 B2 | 1/2006 | Fletcher et al. | |
| 7,003,578 B2 | 2/2006 | Kanada et al. | |
| 7,042,988 B2 | 5/2006 | Juitt et al. | |
| 7,111,060 B2 * | 9/2006 | Araujo et al. | 709/224 |
| 7,114,146 B2 | 9/2006 | Zhang et al. | |
| 7,114,148 B2 | 9/2006 | Irving et al. | |
| 7,143,094 B2 | 11/2006 | Arroyo et al. | |
| 7,146,616 B2 | 12/2006 | Dorner et al. | |
| 7,185,342 B1 | 2/2007 | Carrer et al. | |

(Continued)

OTHER PUBLICATIONS

Parlay APIs 4.0, Parlay X Web Services White Paper, The Parlay Group: Parlay X Working Group, Dec. 16, 2002, 12 pages.

(Continued)

*Primary Examiner*—Melur Ramakrishnaiah
(74) *Attorney, Agent, or Firm*—Townsend and Townsend and Crew LLP (57) ABSTRACT

Methods, systems, and devices are disclosed for exposing access network capabilities using an enabler proxy. In one embodiment, a device for providing access to one or more capabilities of a wireless network comprises a first interface to communicate with an application, a second interface to communicate on a wireless network as a subscriber device, and logic to process requests from the network-based application to access one or more capabilities of the wireless network. The logic may be configured to process the requests by at least using one or more services subscribed to by the device.

15 Claims, 7 Drawing Sheets

U.S. PATENT DOCUMENTS

| | | | |
|---|---|---|---|
| 7,194,482 B2 | 3/2007 | Larkin et al. | |
| 7,222,334 B2 | 5/2007 | Casati et al. | |
| 7,272,625 B1 | 9/2007 | Hannel et al. | |
| 7,340,508 B1 | 3/2008 | Kasi et al. | |
| 7,409,707 B2 | 8/2008 | Swander et al. | |
| 7,411,943 B2 | 8/2008 | Kittredge et al. | |
| 7,447,793 B2 | 11/2008 | Morioka | |
| 7,454,399 B2 | 11/2008 | Matichuk | |
| 7,461,062 B2 | 12/2008 | Stewart et al. | |
| 7,580,994 B1 | 8/2009 | Fiszman et al. | |
| 2002/0087674 A1 | 7/2002 | Guilford et al. | |
| 2002/0101879 A1 | 8/2002 | Bouret | |
| 2002/0111848 A1 | 8/2002 | White | |
| 2002/0143819 A1 | 10/2002 | Han et al. | |
| 2002/0178122 A1 | 11/2002 | Maes | |
| 2002/0184373 A1 | 12/2002 | Maes | |
| 2002/0194388 A1 | 12/2002 | Boloker et al. | |
| 2002/0198719 A1 | 12/2002 | Gergic et al. | |
| 2002/0198991 A1 | 12/2002 | Gopalakrishnan et al. | |
| 2003/0003953 A1* | 1/2003 | Houplain | 455/553 |
| 2003/0023953 A1 | 1/2003 | Lucassen et al. | |
| 2003/0046316 A1 | 3/2003 | Gergic et al. | |
| 2003/0061268 A1 | 3/2003 | Moerdijk et al. | |
| 2003/0061404 A1 | 3/2003 | Atwal et al. | |
| 2003/0115203 A1* | 6/2003 | Brown et al. | 707/10 |
| 2003/0115260 A1* | 6/2003 | Edge | 709/203 |
| 2003/0131076 A1 | 7/2003 | Nelson et al. | |
| 2003/0191769 A1 | 10/2003 | Crisan et al. | |
| 2003/0208539 A1 | 11/2003 | Gildenblat et al. | |
| 2003/0217044 A1 | 11/2003 | Zhang et al. | |
| 2003/0229812 A1 | 12/2003 | Buchholz | |
| 2004/0015547 A1* | 1/2004 | Griffin et al. | 709/204 |
| 2004/0110493 A1* | 6/2004 | Alvarez et al. | 455/414.1 |
| 2004/0128546 A1 | 7/2004 | Blakley et al. | |
| 2004/0139319 A1 | 7/2004 | Favazza et al. | |
| 2004/0176988 A1 | 9/2004 | Boughannam | |
| 2004/0221005 A1 | 11/2004 | Albaugh et al. | |
| 2005/0015340 A1 | 1/2005 | Maes | |
| 2005/0021670 A1 | 1/2005 | Maes | |
| 2005/0054287 A1* | 3/2005 | Kim | 455/3.05 |
| 2005/0086197 A1 | 4/2005 | Boubez et al. | |
| 2005/0091156 A1 | 4/2005 | Hailwood et al. | |
| 2005/0125696 A1 | 6/2005 | Afshar et al. | |
| 2005/0132086 A1 | 6/2005 | Flurry et al. | |
| 2005/0228984 A1 | 10/2005 | Edery et al. | |
| 2005/0249190 A1 | 11/2005 | Birch | |
| 2005/0249344 A1 | 11/2005 | Mueller et al. | |
| 2006/0014688 A1 | 1/2006 | Costa et al. | |
| 2006/0041669 A1 | 2/2006 | Bemmel et al. | |
| 2006/0143686 A1 | 6/2006 | Maes | |
| 2006/0165060 A1 | 7/2006 | Dua | |
| 2006/0178898 A1 | 8/2006 | Habibi | |
| 2006/0190600 A1 | 8/2006 | Blohm et al. | |
| 2006/0212574 A1 | 9/2006 | Maes | |
| 2006/0256774 A1 | 11/2006 | Rigaldies et al. | |
| 2006/0272028 A1 | 11/2006 | Maes | |
| 2006/0282856 A1 | 12/2006 | Errico et al. | |
| 2006/0291507 A1 | 12/2006 | Sarosi et al. | |
| 2007/0011322 A1 | 1/2007 | Moiso | |
| 2007/0061397 A1 | 3/2007 | Gregorat et al. | |
| 2007/0100831 A1 | 5/2007 | Cox | |
| 2007/0100981 A1 | 5/2007 | Adamczyk et al. | |
| 2007/0118618 A1 | 5/2007 | Kisel et al. | |
| 2007/0150480 A1 | 6/2007 | Hwang et al. | |
| 2007/0150936 A1 | 6/2007 | Maes | |
| 2007/0203841 A1 | 8/2007 | Maes | |
| 2007/0204017 A1 | 8/2007 | Maes | |
| 2007/0233883 A1 | 10/2007 | De Lutiis et al. | |
| 2007/0239866 A1 | 10/2007 | Cox et al. | |
| 2007/0271554 A1 | 11/2007 | Fletcher et al. | |
| 2007/0276907 A1 | 11/2007 | Maes | |
| 2007/0280226 A1 | 12/2007 | Sonalkar et al. | |
| 2007/0291859 A1 | 12/2007 | Maes | |
| 2008/0025243 A1 | 1/2008 | Corneille et al. | |
| 2008/0080479 A1 | 4/2008 | Maes | |
| 2008/0151918 A1 | 6/2008 | Foti | |
| 2008/0162637 A1 | 7/2008 | Adamczyk et al. | |
| 2008/0168523 A1 | 7/2008 | Ansari et al. | |
| 2008/0186845 A1 | 8/2008 | Maes | |
| 2008/0189401 A1 | 8/2008 | Maes | |
| 2008/0228919 A1 | 9/2008 | Doshi et al. | |
| 2008/0232567 A1 | 9/2008 | Maes | |
| 2008/0235230 A1 | 9/2008 | Maes | |
| 2008/0235327 A1 | 9/2008 | Maes et al. | |
| 2008/0235354 A1 | 9/2008 | Maes | |
| 2008/0235380 A1 | 9/2008 | Maes | |
| 2008/0288966 A1 | 11/2008 | Maes | |
| 2008/0301135 A1 | 12/2008 | Alves et al. | |
| 2008/0307108 A1 | 12/2008 | Yan et al. | |
| 2009/0006360 A1 | 1/2009 | Liao et al. | |
| 2009/0015433 A1 | 1/2009 | James et al. | |
| 2009/0034426 A1 | 2/2009 | Luft et al. | |
| 2009/0112875 A1 | 4/2009 | Maes | |
| 2009/0119303 A1 | 5/2009 | Rio et al. | |
| 2009/0125595 A1 | 5/2009 | Maes | |
| 2009/0132717 A1 | 5/2009 | Maes | |
| 2009/0187919 A1 | 7/2009 | Maes | |
| 2009/0193057 A1 | 7/2009 | Maes | |
| 2009/0193433 A1 | 7/2009 | Maes | |
| 2009/0201917 A1 | 8/2009 | Maes et al. | |
| 2009/0228584 A1 | 9/2009 | Maes et al. | |
| 2010/0049640 A1 | 2/2010 | Maes | |
| 2010/0049826 A1 | 2/2010 | Maes | |
| 2010/0058436 A1 | 3/2010 | Maes | |
| 2010/0077082 A1 | 3/2010 | Hession et al. | |

OTHER PUBLICATIONS

U.S. Appl. No. 11/024,160, filed Dec. 2004, Maes.

Andrews, Tony et al, Business Process Execution Language for Web Services, Version 1.1, BEA Systems, International Business Machines Corporation, SAP AG, Siebel Systems, May 5, 2003, 31 pages.

Liberty Architecture Overview, Liberty Alliance Project Version 1.1, Piscataway New Jersey, Jan. 15, 2003, 44 pages.

Maes, Stephanie, Multi-modal Web IBM Position W3C/WAP Workshop, IBM Research Human Language Technologies, downloaded http://www.w3.org on May 26, 2003, 9 pages.

Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.

Policy-Based Management Tom Sheldon's Linktionary, downloaded http://www.linktionary.com/policy.html on Aug. 2, 2004, 4 pages.

Seely, Scott, "XML and Web Services Security: Understanding WS-Security", Microsoft Corporation, 2002.

Simpson et al, Java Product Review—Oracle EDA Suite, Dec. 4, 2006, Open Source Magazine, pp. 1-10.

Single Sign on Deployment Guide, Introduction to Single-Sign-On, Netscape 6 Documentation Training Manual http://developer.netscape.com/docs/manuals/security/SSO/sso.htm on May 26, 2003, 5 Pages.

Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

Thomas Manes, Anne, "Registering a Web Service in UDDI", 2003.

U.S. Appl. No. 11/877,129, filed Oct. 23, 2007, Final Office Action mailed Mar. 29, 2010, 17 pages.

U.S. Appl. No. 11/877,129, filed Oct. 23, 2007, Office Action mailed Sep. 28, 2009, 15 pages.

U.S. Appl. No. 11/926,738, filed Oct. 29, 2007, Office Action mailed Feb. 24, 2010, 12 pages.

U.S. Appl. No. 11/943,101, filed Nov. 20, 2007, Advisory Action mailed Apr. 16, 2010, 3 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Office Action mailed Jul. 8, 2009, 9 pages.
U.S. Appl. No. 11/951,500, filed Dec. 6, 2007, Final Office Action mailed Mar. 30, 2010, 26 pages.
U.S. Appl. No. 11/951,500, filed Dec. 6, 2007, Office Action mailed Sep. 22, 2009, 24 pages.
U.S. Appl. No. 12/019,299, filed Jan. 24, 2008, Office Action mailed Mar. 31, 2010, 13 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Final Office Action mailed May 10, 2010, 15 pages.
U.S. Appl. No. 11/848,347, filed Aug. 31, 2007, Office Action mailed Oct. 29, 2009, 12 pages.
U.S. Appl. No. 11/877,129, filed Oct. 23, 2007, Advisory Action mailed Jun. 3, 2010, 2 pages.
U.S. Appl. No. 11/926,738, filed Oct. 29, 2007, Final Office Action mailed Jun. 29, 2010, 12 pages.
U.S. Appl. No. 11/951,500, filed Dec. 6, 2007, Advisory Action mailed Jun. 24, 2010, 2 pages.
U.S. Appl. No. 10/855,999, filed May 28, 2004, Office Action dated Jun. 24, 2010, 20 pages.
U.S. Appl. No. 12/045,220, filed Mar. 10, 2008, Advisory Action dated Jun. 11, 2010, 3 pages.

* cited by examiner

METHODS AND SYSTEMS FOR EXPOSING ACCESS NETWORK CAPABILITIES USING AN ENABLER PROXY

CROSS-REFERENCES TO RELATED APPLICATIONS

This application claims the benefit of U.S. Provisional Application No. 60/632,698, entitled "Methods and Systems for Exposing Access Network Capabilities Using An Enabler Proxy" filed Dec. 1, 2004, which is incorporated herein by reference.

BACKGROUND OF THE INVENTION

In today's wireless mobile computing world, there are a variety of different types of wireless networks. Each of the different wireless networks may use enablers to expose various capabilities of the wireless network. The capabilities that are exposed by the enablers are different for each access provider. Exemplary capabilities that may be exposed include device management, device provisioning, device information, call control, device location, and device presence information.

A number of third parties outside the wireless network may have an interest in having access to the capabilities provided by a mobile network. For instance, third parties may want to develop applications for the mobile market that take advantage of the capabilities of a mobile network. As another example, enterprises may want to develop internal applications that use capabilities of mobile networks to mobilize their workforces.

Various technologies exist that allow the mobile network operator to expose access to some of the network capabilities to interested third parties outside the mobile network. These technologies include Parlay (http://www.parlay.org), and Web Service technologies including WSFL, WSXL, UDDI, OASIS WS inspection, OASIS WS-Security, WS-Provisioning, SLA, and others. With all of these technologies, third parties must depend on mobile network operators to expose the mobile network capabilities. However, these technologies are not widely deployed by the mobile network operators. The end result is that third parties are often left without the ability to access the capabilities of a mobile network.

BRIEF SUMMARY OF THE INVENTION

Systems and methods are disclosed for exposing access network capabilities using an enabler proxy. In one embodiment, a method is disclosed which comprises providing an enabler proxy and subscribing the enabler proxy to one or more services available on a wireless network (e.g., a GSM, CDMA, GPRS, or a WiFi network). A connection is established between the enabler proxy and the wireless network. Information is obtained (via the established connection) using one of the services. The obtained information is transmitted to an application (e.g., on request, at predetermined intervals, upon the occurrence of a predetermined event, etc.). In some embodiments, before the information is transmitted, a determination may be made the application is authorized to receive the obtained information.

A variety of different types of information may be obtained using the connection between the enabler proxy and the wireless network. By way of example, the obtained information may be presence information for subscriber device(s) indicating whether the subscriber device(s) are currently communicatively coupled with the wireless network. As another example, the obtained information may be location information for subscriber device(s). Once the information is obtained, it may be transmitted to the application using an established network connection to the application, by email, via a modem connection, or any other type of appropriate transport mechanism, protocol or communication means.

In another embodiment, a method is disclosed with comprises collecting information at an enabler proxy communicating on a wireless network. The information is collected using at least one service subscribed to by the enabler proxy and may be information about one or more devices communicating on the wireless network. A connection is established from the enabler proxy to an application and the collected information is transmitted to the application using the established connection.

In some embodiments, the method may also further include establishing a second connection between the enabler proxy and a second wireless network. The enabler proxy subscribes to service(s) available on the second wireless network and uses at least one of the services to collect information about subscriber devices communicating on the second wireless network. The information for these devices is also transmitted to the application using the established connection.

In a third embodiment, a method is disclosed with comprises providing an enabler proxy and subscribing, with the enabler proxy, to a service available on the wireless network. A connection is established between the enabler proxy and the wireless network. A request to transmit a message (e.g., an MMS message, an SMS message, a voice chat message) to a subscriber device communicating on the wireless network is received at the enabler proxy from an application and the message is transmitted from the enabler proxy to the subscriber device using the established connection and the service. The method may also include receiving a reply message from the subscriber device. The enabler proxy transmits the reply message to the application.

In a fourth embodiment, a method is disclosed which comprises providing an enabler proxy communicating as a subscriber device on a wireless network. A request to initiate a voice call with a second subscriber device is received at the enabler proxy from an application. A voice call from the enabler proxy to the second subscriber device is established and the enabler proxy is used to connect the voice call to the application.

In a fifth embodiment, a method is disclosed which comprises providing an enabler proxy communicating as a subscriber device on a wireless network. A request from a second subscriber device to initiate a voice call with a user of a network-based application is received from a second subscriber device communicating on the wireless network. A voice connection (e.g., a voice over IP connection) is established with the application and the voice connection is connected to the second subscriber device using the enabler proxy.

In a sixth embodiment, a device for providing access to one or more capabilities of a wireless network is disclosed. The device comprises a first interface to communicate with an application and a second interface to communicate on a wireless network. The device also comprises logic to process requests from the application to access one or more capabilities of the wireless network. The logic may be configured to process the requests by at least using one or more services subscribed to by the device. In some aspects, the logic may also use the second interface to obtain information for one or more additional subscriber devices communicating on the wireless network. In some embodiments, the device may further comprise a data storage to store the additional subscriber device information. The device may also or additionally have a SIM or a USIM.

A further understanding of the nature and advantages of the present invention may be realized by reference to the remaining portions of the specification and the drawings.

DETAILED DESCRIPTION OF THE INVENTION

Figure 1:
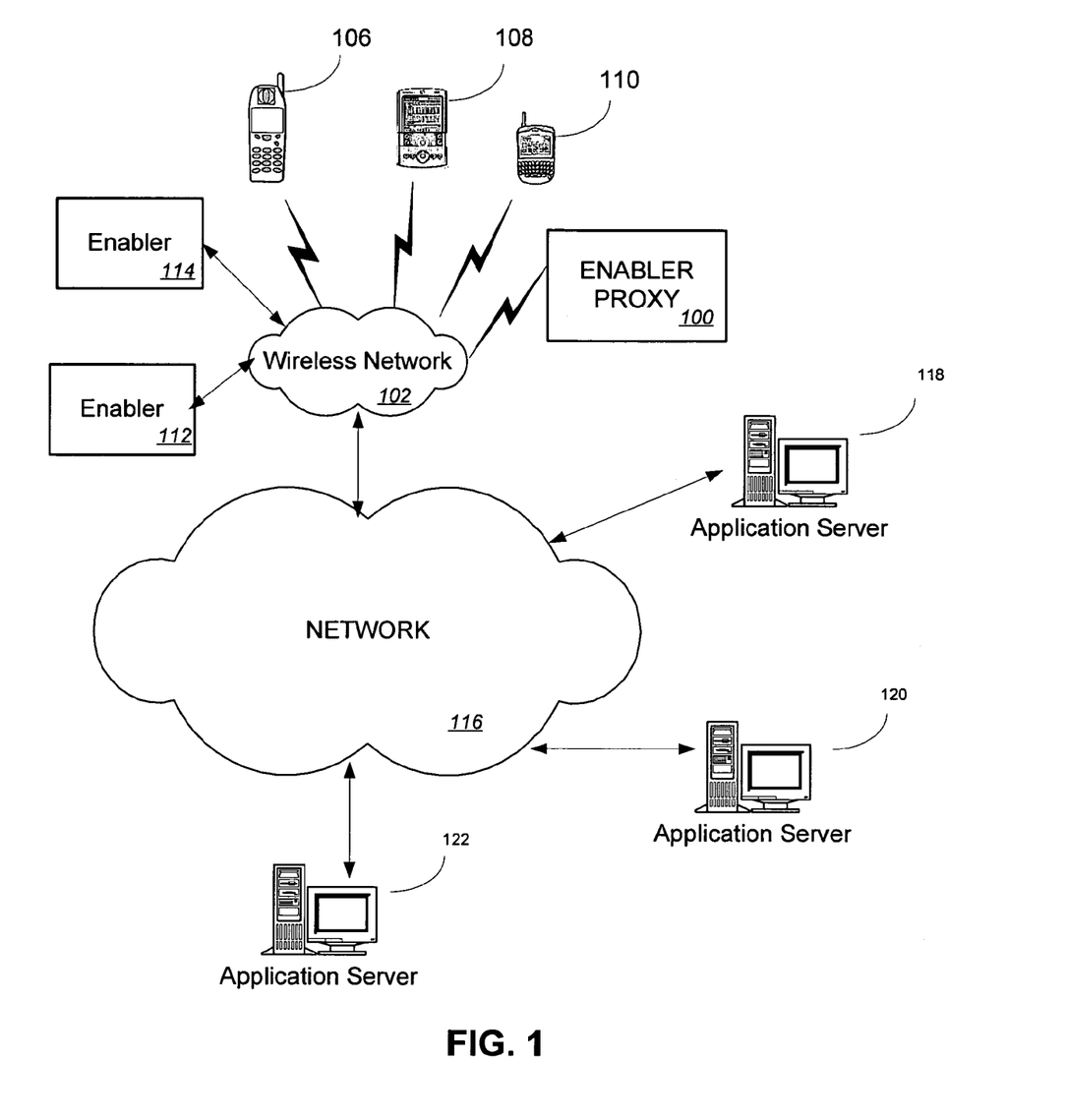
FIG. 1 is a block diagram illustrating a system using an enabler proxy to expose capabilities of wireless networks to network-based applications.

FIG. 1 illustrates an exemplary embodiment of a system that uses an enabler proxy to expose capabilities of a wireless network. In FIG. 1, a number of wireless mobile devices 106, 108, 110 are communicatively coupled to wireless network 102. Wireless mobile devices 106, 108, 110 may be mobile telephones, personal data assistants (PDA) with wireless capabilities, laptops with wireless capabilities, wireless devices for receiving email communications (e.g., Blackberry® devices), or other types of wireless device It should be appreciated that wireless network 102 may also have additional wireless mobile devices (not shown) connected thereto.

Wireless network 102 employs a communication format for communications on the network 102. By way of example, the communication format may be Code Division Multiple Access (CDMA), Time Division Multiple Access (TDMA), Global System for Mobile Communication (GSM), WiFi (IEEE 802.11), General Packet Radio Service (GPRS), 3G, and other wireless network technologies. In addition to the communication format employed by the wireless network 102, wireless network 102 may also employ proprietary standards for communications.

One or more enablers 112, 114 may also be communicatively coupled with wireless network 102. The enablers 112, 114 may be used to provide one or more capabilities exposed on wireless network 102 to subscriber devices 106, 108, 110. These capabilities may include device management, device provisioning, device information, call control, device location information, device presence information, voice chat, push to talk over cellular, different forms of messaging (e.g., Multi-Media Messaging Service (MMS), Short Messaging Service (SMS), instant messaging (IM), email, fax, etc.), Digital Rights Management (DRM), Internet browsing, content download, data synchronization, or other types of capabilities available on wireless network 102.

Enabler proxy 100 also communicates on wireless network 102 and subscribes to one or more services available on wireless network 102. By way of example, enabler proxy 100 may subscribe to SMS, MMS, IM, voice chat, push to talk over cellular, email, content download, presence information, location information or other capabilities or services available on wireless network 102. Enabler proxy 100 may be a component of a subscriber device or may be any other device communicating on wireless network 102 which can subscribe to available service(s). In some embodiments, enabler proxy 100 may also communicate and subscribe to services on one or more additional wireless networks (not shown).

Using the subscribed services, enabler proxy 100 may expose one or more capabilities of wireless network 102 to one or more applications (not shown) executing on one or more application servers 118, 120, 122. Application servers 118, 120, 116 may communicate on network 116, such as a wide area network (e.g., the Internet), a Virtual Private Network (VPN), a local area network (LAN), or other type of network. As shown in FIG. 1, in one embodiment, wireless network 100 may be communicatively coupled with network 116 and enabler proxy 100 may communicate with application servers 118, 120, 122 via wireless network 102. In another embodiment, enabler proxy 100 may communicate with an application executing on application server 118 by dialing in to or otherwise accessing a modem associated with application server(s) 118, 120, 122. Other appropriate communication mechanisms may also be used to communicate with application servers 118, 120, 122. As will be described further below, applications executing on application servers 118, 120, 122 may use enabler proxy 100 to access capabilities of wireless network 102 (e.g., messaging, location, or presence capabilities). It should be appreciated that by using enabler proxy 100, third-parties may access capabilities of the wireless network 102 which may otherwise not be available to them. Thus, the third-parties (such as enterprises or content providers) may build applications that take advantage of the capabilities of wireless network 102 without relying on the network provider to expose the capabilities of the network.

Figure 2:
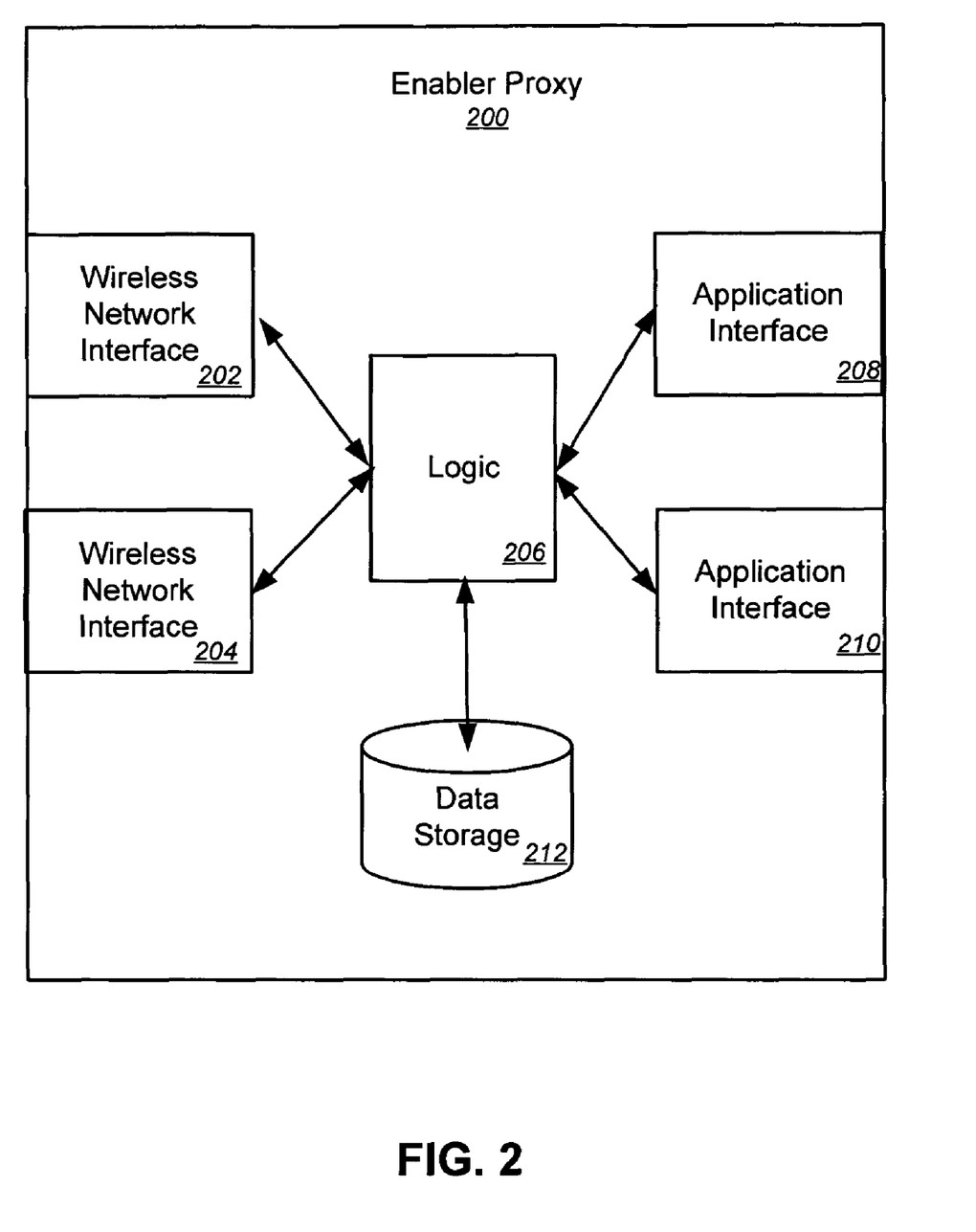
FIG. 2 is a block diagram illustrating an exemplary enabler proxy.

FIG. 2 illustrates an exemplary enabler proxy 200 that may be used to expose capabilities of one or more wireless networks. Enabler proxy 100 may be a smart phone platform or a more advanced computing platform associated with one or more subscriber identifiers used to communicate on a wireless network. As shown in FIG. 2, enabler proxy 200 includes one or more wireless network interfaces 202, 204. Each wireless network interface 202, 204 may be used to communicate on a wireless network as a subscriber device. Thus, in some embodiments, wireless network interfaces 202, 204 may each be associated with a subscriber identity, such as an MSISDN, a phone number, or other type of identifier. Additionally, wireless network interfaces 202, 204 may include components, such as SIMs, USIMs, or other components that may be used to communicate on the respective wireless networks associated with each of the wireless network interfaces 202, 204.

Wireless network interfaces 202, 204 may be used to access and communicate on wireless networks provided by different mobile network operators (MNOs) or other providers of a wireless network. The wireless network interfaces 202, 204 may thus each communicate on the wireless network using the designated communication format for the associated wireless network. By way of example, communication formats that may be used by a wireless network include CDMA, TDMA, GSM, WiFi, GPRS, EDGE, 2G, 3G, and other types of wireless network technologies. The wireless networks associated with each wireless network interface 202, 204 may both use the same communication protocols or different communication protocols.

As illustrated in FIG. 2, enabler proxy 200 has two wireless network interfaces 202, 204. It should be appreciated that in alternate embodiments, enabler proxy 200 may include fewer or additional wireless network interfaces 202, 204. It should also be appreciated that a wireless network interface 202, 204 used to communicate on a particular wireless network may in some instances access and communicate on a different wireless network through the use of roaming.

Subscriber identities associated with enabler proxy 200 may each subscribe to one or more services available on the wireless networks associated with wireless network interfaces 202, 204. The subscribed services may include device location information, presence information, voice chat, push to talk over cellular, different forms of messaging (e.g., MMS, SMS, IM, email, fax), content download, DRM, browsing, device management, device provisioning, device information, call control, streaming, application provisioning, and any other capabilities or services offered by the respective wireless networks. The services subscribed to by enabler proxy 200 may be exposed to applications via one or more application interfaces 208, 210.

Application interfaces 208, 210 may each be used to communicate with one or more applications executing on an application server. One or more of the application interfaces 208, 210 may be interfaces to a Wide Area Network (e.g., the Internet), a Local Area Network (LAN), a Virtual Private Network (VPN), or other type of network connection to an application server. In embodiments in which one or more of application interfaces 208, 210 are interfaces to the Internet, application interface(s) 208, 210 may be web services interfaces. In other embodiments, one or more of the application interfaces 208, 210 may include a modem to access a modem associated with an application server. Any other means to communicate with applications executing on application servers may also be employed by application interfaces 208, 210. Although FIG. 2 illustrates enabler proxy 200 having two application interfaces 208, 210, it should be appreciated that enabler proxy 200 may include fewer or additional application interfaces 208, 210.

Enabler proxy 200 further includes logic 206 (e.g., machine executable instructions) to provide functionality to expose one or more capabilities of wireless network(s) associated with one or more wireless network interfaces 202, 204 to one or more applications associated with one or more application interfaces 208, 210. Logic 206 may use wireless network interfaces 202, 204 to obtain information (e.g., location or presence information) from enablers on the network and may communicate the information to applications. Alternatively, or additionally, logic 206 may use wireless network interfaces 202, 204 to transmit communications (e.g., MMS, SMS communications) from application(s) to other subscribers on wireless network(s), to establish voice calls between users of application(s) and other subscribers on wireless network(s), and/or to access other capabilities of wireless network(s). Similarly, logic 206 may use application interfaces 208, 210 to receive requests from application(s), to transmit information to application(s), to transmit communications from other subscribers on wireless network(s), to establish voice calls (e.g., voice over IP) between subscribers on wireless network(s) and applications, and/or to provide other capabilities of wireless network(s) to application(s).

Logic 206 may obtain information from a wireless network as requested by an application or may collect the information on a periodic basis and transmit the information after it is collected or transmit the information upon the request of an application. In some embodiments, enabler proxy 200 may include a data storage 212, communicatively coupled with logic 206, to store subscriber device information collected by logic 206. Data storage 212 may be a relational database, an object-oriented database, a text file, internal software structure, a spreadsheet, or other suitable structure for storing information. In addition to subscriber device information, data storage 212 or a different data storage may store authorization/authentication information used to verify an application has authority to access subscriber information. Data storage 212 may store additional information that may be used to facilitate access or use of wireless network capabilities by application(s).

It should be appreciated that enabler proxy 200 may include additional or fewer components than illustrated in FIG. 2 to expose capabilities of wireless network(s) to application(s). It should also be appreciated that components of enabler proxy 200 and/or components of logic 206 may reside on the same or different physical devices. For instances, data storage 212 may reside on a different machine communicatively coupled with logic 206. As another example, wireless network interfaces 202, 204 may reside on devices (e.g., mobile phones, or "smart phone" platforms) that communicate with logic 206 residing on a different physical device.

Figure 3:
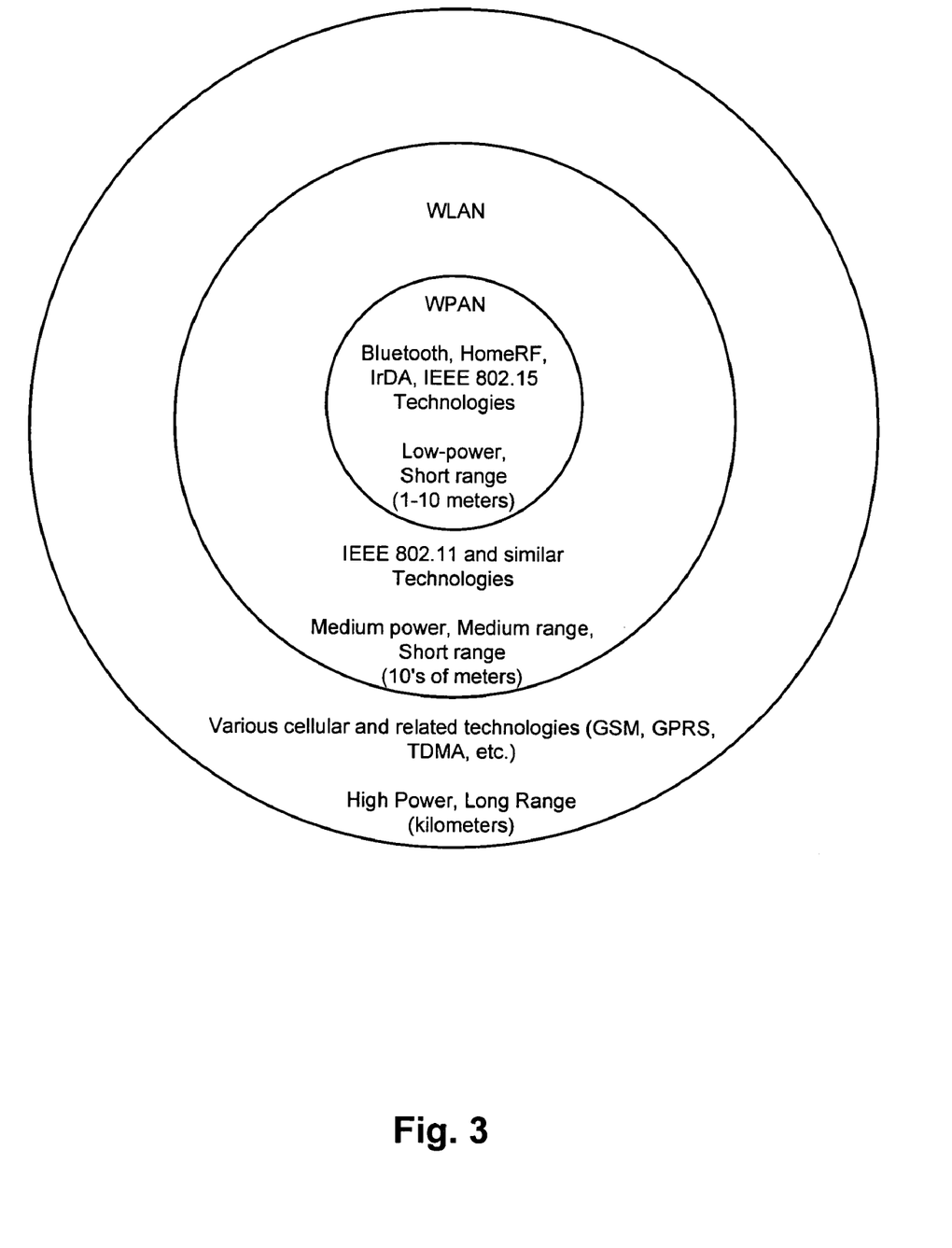
FIG. 3 illustrates a simplified comparison of several currently available mobile network technologies.

FIG. 3 illustrates exemplary wireless network technologies which may be used by a wireless network provider. Wireless network technologies include wireless wide area network (WWAN), wireless local area network (WLAN) and wireless personal area network (WPAN) technologies. WWAN technologies typically include cellular and related technologies such as GSM, GPRS, CDPD, CDMA, TDMA, CDMA, EDGE, 3G, etc. WWAN networks are high power, long range networks that typically have an access range on the order of several kilometers on up WLAN technologies, on the other hand, are medium power, medium range networks that have an access range on the order of tens of meters while WPAN networks are low power, short range networks that typically have an access range of about 10 meters or less. Examples of WLAN technologies include the IEEE 802.11 (a), (b), (e) and (g) technologies and examples of WPAN technologies include Bluetooth, HomeRF, IrDA and IEEE 802.15 technologies.

Figure 4:
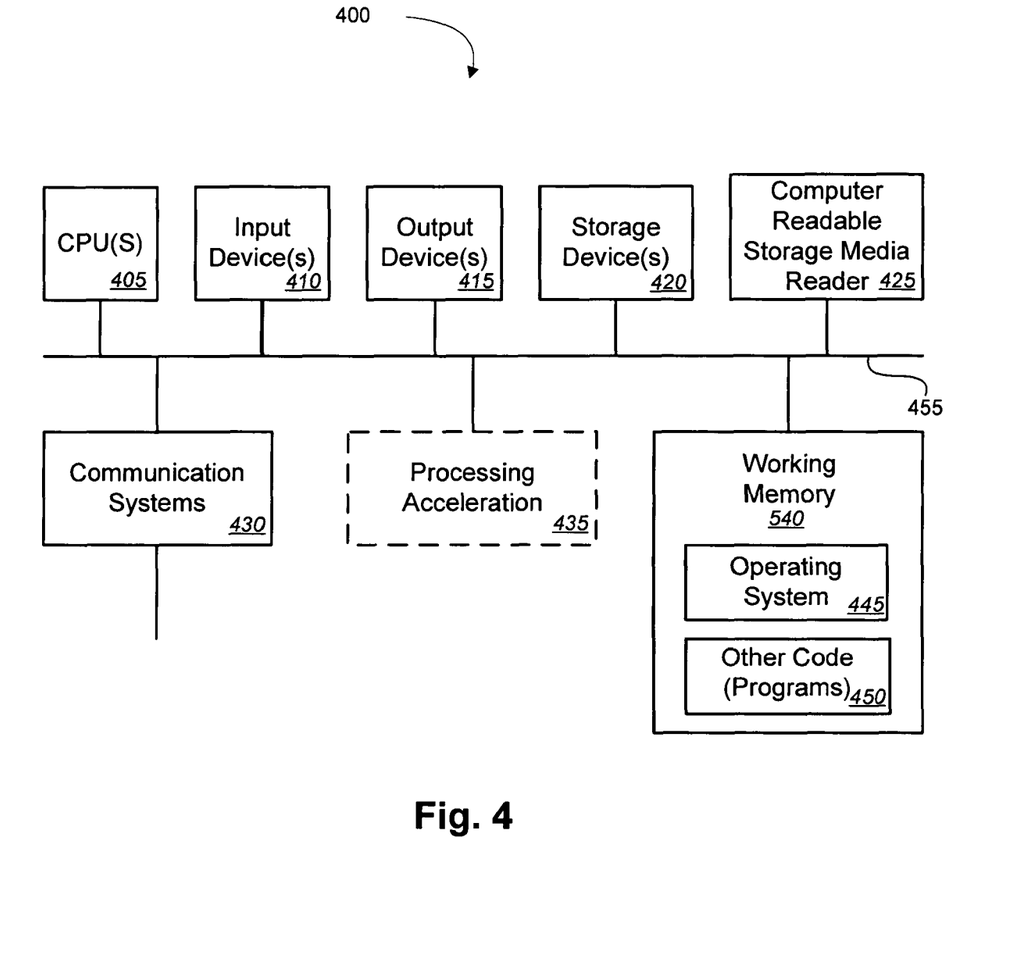
FIG. 4 is a block diagram of a computer system upon which an enabler proxy or components of an enabler proxy may be implemented.

In one embodiment, enabler proxy may be implemented as a component on a mobile phone. In an alternate embodiment, enabler proxy may be implemented on a more advanced computing system. FIG. 4 illustrates one embodiment of a computer system 400 upon which an enabler proxy (or components of an enabler proxy) may be implemented. The computer system 400 is shown comprising hardware elements that may be electrically coupled via a bus 455. The hardware elements may include one or more central processing units (CPUs) 405; one or more input devices 410 (e.g., a mouse, a keyboard, etc.); and one or more output devices 415 (e.g., a display device, a printer, etc.). The computer system 400 may also include one or more storage device 420. By way of example, storage device(s) 420 may be disk drives, optical storage devices, solid-state storage device such as a random access memory ("RAM") and/or a read-only memory ("ROM"), which can be programmable, flash-updateable and/or the like.

The computer system 400 may additionally include a computer-readable storage media reader 425; a plurality of communication systems 430, and working memory 440, which may include RAM and ROM devices as described above. In some embodiments, computer system 400 may also include a processing acceleration unit 435, which may include a DSP, a special-purpose processor and/or the like.

The computer-readable storage media reader 425 can further be connected to a computer-readable storage medium, together (and, optionally, in combination with storage device(s) 420) comprehensively representing remote, local, fixed, and/or removable storage devices plus storage media for temporarily and/or more permanently containing computer-readable information. Communication systems 430 may permit data to be exchanged with subscriber devices communicating on one or more wireless network(s), wireless network enablers, and applications executing on either computer system 400 or other computer systems. By way of example, communication systems 430 may include an antenna, one or more SIMs, one or more USIMs, one or more wireless network cards, one or more network interface cards (NICs) or other wired network cards, one or more infra-red communication devices, or other type of communication systems that may be used to communicate on a wireless network or to communicate with applications or application servers.

The computer system 400 may also comprise software elements, shown as being currently located within a working memory 440, including an operating system 445 and/or other program code 450. Program code 450 may implement logic of an enabler proxy, and/or the methods of the invention. It should be appreciate that alternate embodiments of a computer system 400 may have numerous variations from that described above. For example, customized hardware might also be used and/or particular elements might be implemented in hardware, software (including portable software, such as applets), or both.

Figure 5:
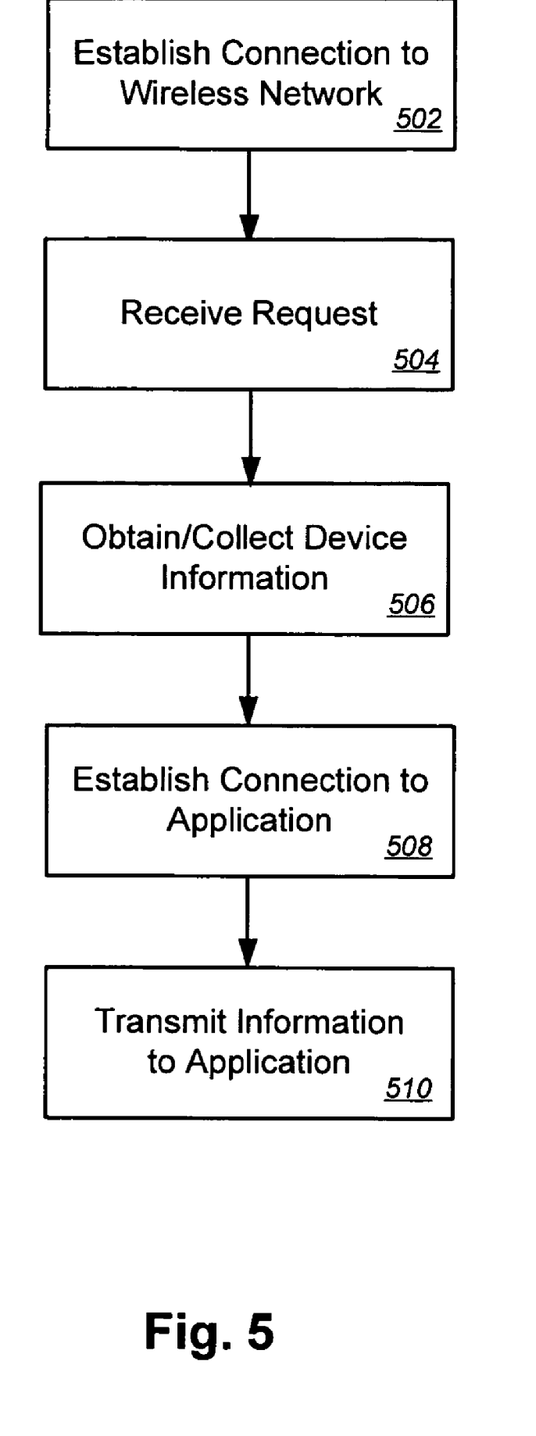
FIG. 5 is a flow diagram illustrating an exemplary method of using an enabler proxy to obtain subscriber device information for an application.

FIG. 5 illustrates an exemplary method of using an enabler proxy to obtain subscriber device information for an application. As previously described, the enabler proxy may subscribe to one or more services or other capabilities provided by the wireless network. Enabler proxy may expose one or more of those services or capabilities to application(s).

The method may include establishing 502 a connection between the enabler proxy and the wireless network. The connection may be established 502 by any appropriate mechanism for the wireless network. In some instances, the connection may be established 502 when the enabler proxy is powered on. Using the established connection, the enabler proxy may communicates on the wireless network. It should be appreciated that enabler proxy may communicate on more than one wireless network and thus connections may be established to more than one wireless network.

An application wanting to obtain information about a subscriber device, such as location information or device presence information (indicating whether a subscriber device is currently in communications with the wireless network), may transmit a request for the information to the enabler proxy and the request may be received 504 by the enabler proxy. The enabler proxy may then obtain 506 the requested information using the established connection to the wireless network. In alternate embodiments, the enabler proxy may not wait until a request is received 504, but may instead proactively collect 506 information on one or more subscriber devices. The information on subscriber device(s) may be obtained/collected 506 using services or capabilities available on the wireless network which are subscribed to by the enabler proxy. For instances, location information may be obtained by accessing an enabler on the wireless network that provides location information on subscriber devices. Optionally, the collected 506 information may be stored in a data storage for future transmittal to application(s) or other use.

A connection may also be established 508 between the enabler proxy and the application. By way of example, the connection may be established 508 by establishing a network connection to an application server executing the application (e.g., an Internet connection, a web services connection, a LAN connection, or a VPN connection). Alternately, the connection may be established 508 by accessing a modem associated with the application, sending an email or other appropriate communication connection.

The information may then be transmitted 510 to the application using the established connection. Alternately, information may be transmitted 510 to an application by messaging (e.g., sending an email with the information or sending an SMS/MMS message with the information). Information may be transmitted 510 in response to a request 502 for the information and/or may be transmitted 510 to the application on a periodic basis. Optionally, the information may be encrypted before it is transmitted 510.

In some embodiments, the enabler proxy may make a determination at some point before the information is transmitted 510 whether the application(s) is authorized to have the requested or otherwise collected information. This may be done by the enabler proxy (e.g., by consulting a database of information) or by accessing a separate authorization module. The information that an application may be authorized to obtain may vary with different subscriber devices. Users associated with subscriber devices may communicate authorization preferences to the enabler proxy. Authorization may also or additionally be managed by enabler(s) on the wireless network and users associated with subscriber devices may authorize the enabler(s) to provide information to the enabler proxy.

Figure 6:
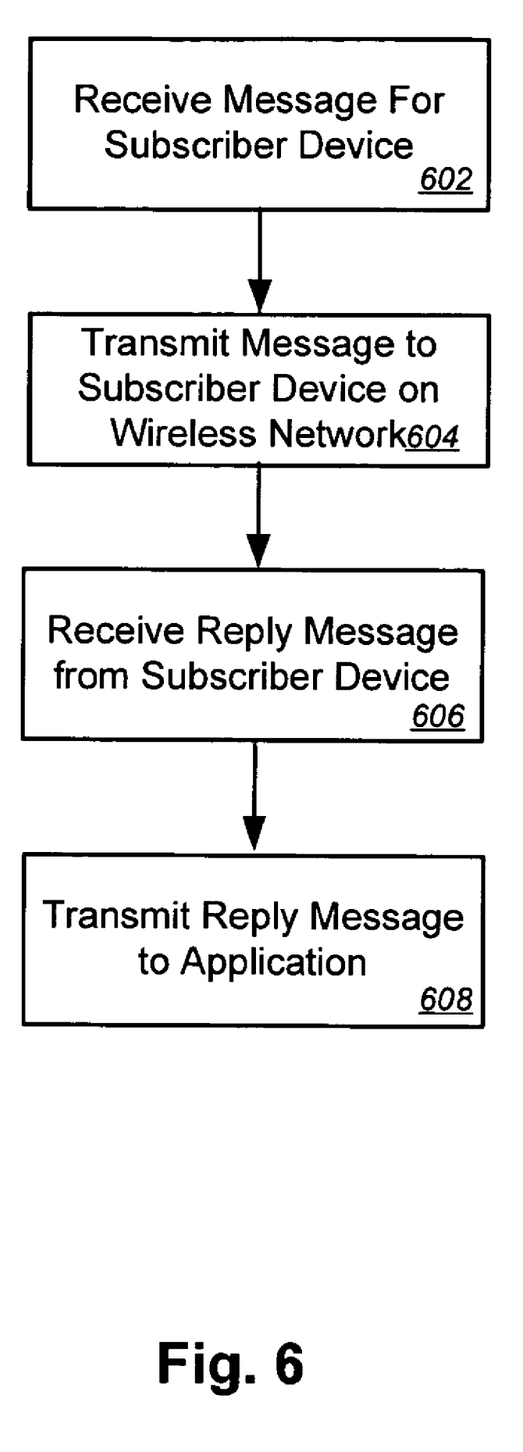
FIG. 6 is a flow diagram illustrating an exemplary method of transmitting messages using an enabler proxy.

FIG. 6 illustrates an exemplary method of transmitting messages using an enabler proxy. A request may be received 602 from an application to transmit a message (e.g., a notification) to a subscriber device communicating on a wireless network on which the enabler proxy is also communicating as a subscriber device. The enabler proxy may then use one or more subscribed services/capabilities of the wireless network to transmit 604 the message. By way of example, enabler proxy may transmit 604 the message to the designated subscriber device via text messaging (e.g., SMS), multi-media messaging (e.g., MMS), voice chat, or other appropriate messaging mechanism.

In some embodiments, the message may be a message, such as an actionable notification, that may be replied to by the recipient subscriber device. Thus, in these embodiments, a reply message may be received 606 from the recipient subscriber device to be delivered to the application. The enabler proxy may then use a communication connection to the application to transmit 608 the reply message to the application (e.g., via messaging, email, network connection, modem connection). It should be appreciated that in alternate embodiments, subscriber devices may send messages to an application using enabler proxy without first receiving a message from the application.

Figure 7:
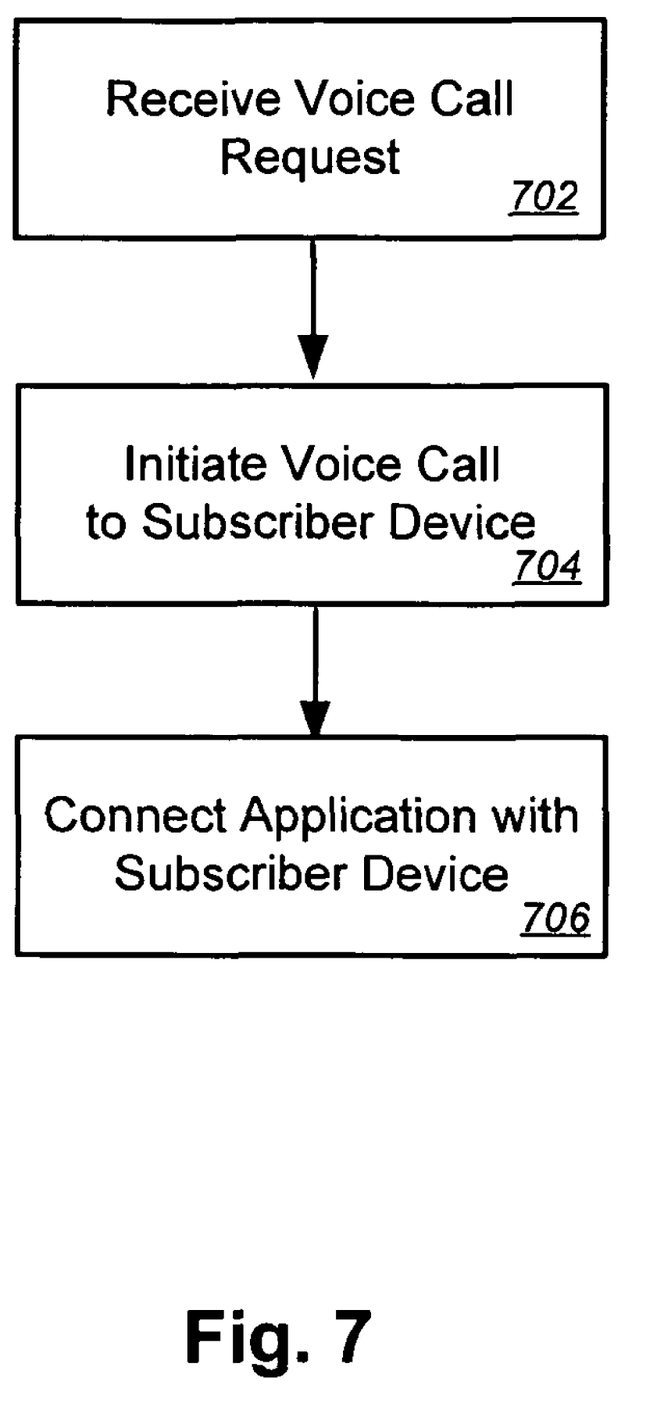
FIG. 7 is a flow diagram illustrating an exemplary method of using an enabler proxy for voice call communications between an application and subscriber device communicating on a wireless network.

FIG. 7 illustrates an exemplary method of using an enabler proxy for voice call communications between an application and a subscriber device communicating on a wireless network. An enabler proxy may receive a request 702 from an application to initiate a voice call with a subscriber device communicating on a wireless network upon which the enabler proxy may also be communicating as a subscriber device. The enabler proxy may initiate 704 a voice call to the subscriber device and may then connect 706 the voice call initiated with the subscriber device to the application (e.g., conference call, voice over IP, voice chat). In an alternate embodiment, a subscriber device may use enabler proxy to initiate a call to a user of an application.

In the foregoing description, for the purposes of illustration, methods were described in a particular order. It should be appreciated that in alternate embodiments, the methods may be performed in a different order than that described. Additionally, the methods may include fewer, additional, or different blocks than those described. Additional methods may also be performed by an enabler proxy to expose capabilities of a wireless network to applications. For instance, an application may use an enabler proxy download content to a subscriber device or to perform data synchronization.

The methods may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art

What is claimed is:

1. A machine readable storage medium having sets of machine-executable instructions stored thereon which, when executed by a machine, cause the machine to:
   provide an enabler proxy;
   subscribe the enabler proxy to one or more capabilities of a wireless network which are not exposed to third party content or service providers by the wireless network's provider, wherein the enabler proxy is configured to provide the third party content or service providers with access the capabilities of the wireless network which are not exposed;
   establish a connection between the enabler proxy and the wireless network;
   obtain, by the enabler proxy via the established connection, access to at least one of the capabilities of the wireless network which are not exposed; and
   the enabling proxy, provide the one or more content providers with access to the at least one of the capabilities of the wireless network which are not exposed.

2. The machine readable storage medium of claim 1, wherein the sets of instructions when further executed by the machine, cause the machine to obtain presence information for at least one subscriber device indicating whether the at least one subscriber device is currently communicatively coupled with the wireless network.

3. The machine readable storage medium of claim 1, wherein the sets of instructions when further executed by the machine, cause the machine to obtain location information for at least one subscriber device.

4. The machine readable storage medium of claim 1, wherein establishing the connection comprises establishing a connection on one of a GSM network and a CDMA network.

5. The machine readable storage medium of claim 1, wherein establishing the connection comprises establishing a connection on one of a General Packet Radio Service (GPRS) network and a WiFi network.

6. The machine readable storage medium of claim 1, wherein the sets of instructions when further executed by the machine, cause the machine to establish a network connection from the enabler proxy to an application server executing an application.

7. The machine readable storage medium of claim 6, wherein establishing the connection comprises establishing a virtual private network (VPN) connection.

8. The machine readable storage medium of claim 1, wherein the at least one or the capabilities of the wireless network which are not exposed comprises a presence service.

9. The machine readable storage medium of claim 1, wherein the at least one or the capabilities of the wireless network which are not exposed comprises a service for obtaining location information for subscriber devices.

10. The machine readable storage medium of claim 1, wherein the sets of instructions when further executed by the machine, cause the machine to:
    establish a second connection between the enabler proxy and a second wireless network, the enabler proxy subscribing to one or more services available on the second wireless network;
    at the enabler proxy, use at least one of the services to collect information about one or more subscriber devices communicating on the second wireless network; and
    transmit the information for the second set to the application via the established connection to an application.

11. The machine readable storage medium of claim 1, wherein the sets of instructions when further executed by the machine, cause the machine to:
    receive, at the enabler proxy, a request from an application to transmit a message to a subscriber device communicating on the wireless network; and
    transmit the message from the enabler proxy to a second subscriber device using the established connection and the at least one of the capabilities of the wireless network which are not exposed.

12. The machine readable storage medium of claim 11, wherein the sets of instructions when further executed by the machine, cause the machine to:
    receive, at the enabler proxy, a reply message from the subscriber device; and
    transmit the reply message to the application.

13. The machine readable storage medium of claim 11, wherein transmitting the message comprises transmitting an MMS message.

14. The machine readable storage medium of claim 11, wherein transmitting the message comprises transmitting an SMS message.

15. The machine readable storage medium of claim 11, wherein transmitting the message comprises transmitting a voice chat message.

* * * * *

UNITED STATES PATENT AND TRADEMARK OFFICE
CERTIFICATE OF CORRECTION

| | | |
|---|---|---|
| PATENT NO. | : 7,860,490 B2 | Page 1 of 1 |
| APPLICATION NO. | : 11/130636 | |
| DATED | : December 28, 2010 | |
| INVENTOR(S) | : Stephane H Maes | |

It is certified that error appears in the above-identified patent and that said Letters Patent is hereby corrected as shown below:

In column 6, line 32, delete "up" and insert -- up. --, therefor.

In column 9, line 26, delete "art" and insert -- art. --, therefor.

In column 10, line 14, in claim 8, delete "or" and insert -- of --, therefor.

In column 10, line 17, in claim 9, delete "or" and insert -- of --, therefor.

Signed and Sealed this
Thirteenth Day of September, 2011

David J. Kappos
*Director of the United States Patent and Trademark Office*